(12) United States Patent
Kretschmann et al.

(10) Patent No.: US 8,489,355 B2
(45) Date of Patent: Jul. 16, 2013

(54) METHOD FOR THE DETERMINATION OF LONG-TERM OFFSET DRIFTS OF ACCELERATION SENSORS IN MOTOR VEHICLES

(75) Inventors: Matthias Kretschmann, Regensburg (DE); Jens Daniel Schlachter, Regensburg (DE); Martin Stratesteffen, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 146 days.

(21) Appl. No.: 12/093,539

(22) PCT Filed: Sep. 8, 2006

(86) PCT No.: PCT/EP2006/066171
§ 371 (c)(1),
(2), (4) Date: Sep. 17, 2008

(87) PCT Pub. No.: WO2007/065740
PCT Pub. Date: Jun. 14, 2007

(65) Prior Publication Data
US 2009/0037129 A1    Feb. 5, 2009

(30) Foreign Application Priority Data

Nov. 14, 2005  (DE) .......................... 10 2005 054 208

(51) Int. Cl.
*G01C 17/38*   (2006.01)
(52) U.S. Cl.
USPC ................. 702/96; 702/141; 702/85; 702/92; 702/93; 702/94; 702/142; 702/145; 702/146; 702/147; 702/148
(58) Field of Classification Search
USPC ............. 702/96, 141, 85, 92, 93, 94, 142, 702/145, 146, 147, 148
See application file for complete search history.

(56) References Cited

U.S. PATENT DOCUMENTS

| | | | |
|---|---|---|---|
| 4,651,292 A | 3/1987 | Jeenicke et al. | ............... 702/86 |
| 5,510,989 A * | 4/1996 | Zabler et al. | ..................... 701/1 |

(Continued)

FOREIGN PATENT DOCUMENTS

| | | |
|---|---|---|
| DE | 3212611 A1 | 10/1983 |
| DE | 3334603 A1 | 4/1985 |

(Continued)

OTHER PUBLICATIONS

Argonne National Laboratory, Ask a Scientist (2001).*

(Continued)

*Primary Examiner* — Jonathan C Teixeira Moffat
*Assistant Examiner* — Hyun Park
(74) *Attorney, Agent, or Firm* — King & Spalding L.L.P.

(57) ABSTRACT

A method for determining long-term offset drifts of acceleration sensors in a motor vehicle is provided. In one step, the longitudinal vehicle speed is determined in the vehicle's center of gravity. In another step, the share of the driving dynamics in the longitudinal reference acceleration formula and in the transversal reference acceleration formula is calculated from the longitudinal vehicle speed and the yaw rate. In yet another step, the share of the driving dynamics in the reference acceleration on the vehicle level formula is calculated by converting the driving dynamic reference accelerations formula calculated for the center of gravity to the position formula and the orientation of the sensor formula. In a further step, the long-term offset drift of the sensor is determined from the measured values of the sensor and the share of the measured value in the driving dynamics by means of a situation-dependent averaging process.

14 Claims, 1 Drawing Sheet

U.S. PATENT DOCUMENTS

| | | | |
|---|---|---|---|
| 6,023,664 A | 2/2000 | Bennet | 702/141 |
| 6,360,147 B1* | 3/2002 | Lee | 701/29.7 |
| 6,532,419 B1* | 3/2003 | Begin et al. | 701/504 |
| 6,675,074 B2* | 1/2004 | Hathout et al. | 701/1 |
| 2002/0111763 A1* | 8/2002 | Koga | 702/151 |
| 2003/0033071 A1* | 2/2003 | Kawasaki | 701/80 |
| 2004/0064234 A1* | 4/2004 | Okamoto | 701/70 |
| 2005/0085950 A1* | 4/2005 | Altenkirch | 701/1 |

FOREIGN PATENT DOCUMENTS

| | | | |
|---|---|---|---|
| JP | 2163663 A | | 6/1990 |
| JP | 5072223 A | | 3/1999 |
| JP | 11190742 | | 7/1999 |
| JP | 2000283994 A | | 10/2000 |
| JP | 2002515977 T | | 5/2002 |
| JP | 2003307524 A | | 10/2003 |
| WO | 2005056360 | | 6/2005 |
| WO | 2005101031 | | 10/2005 |

OTHER PUBLICATIONS

International Search Report and Written Opinion; PCT/EP2006/066171; pp. 12, Jan. 19, 2007.

* cited by examiner

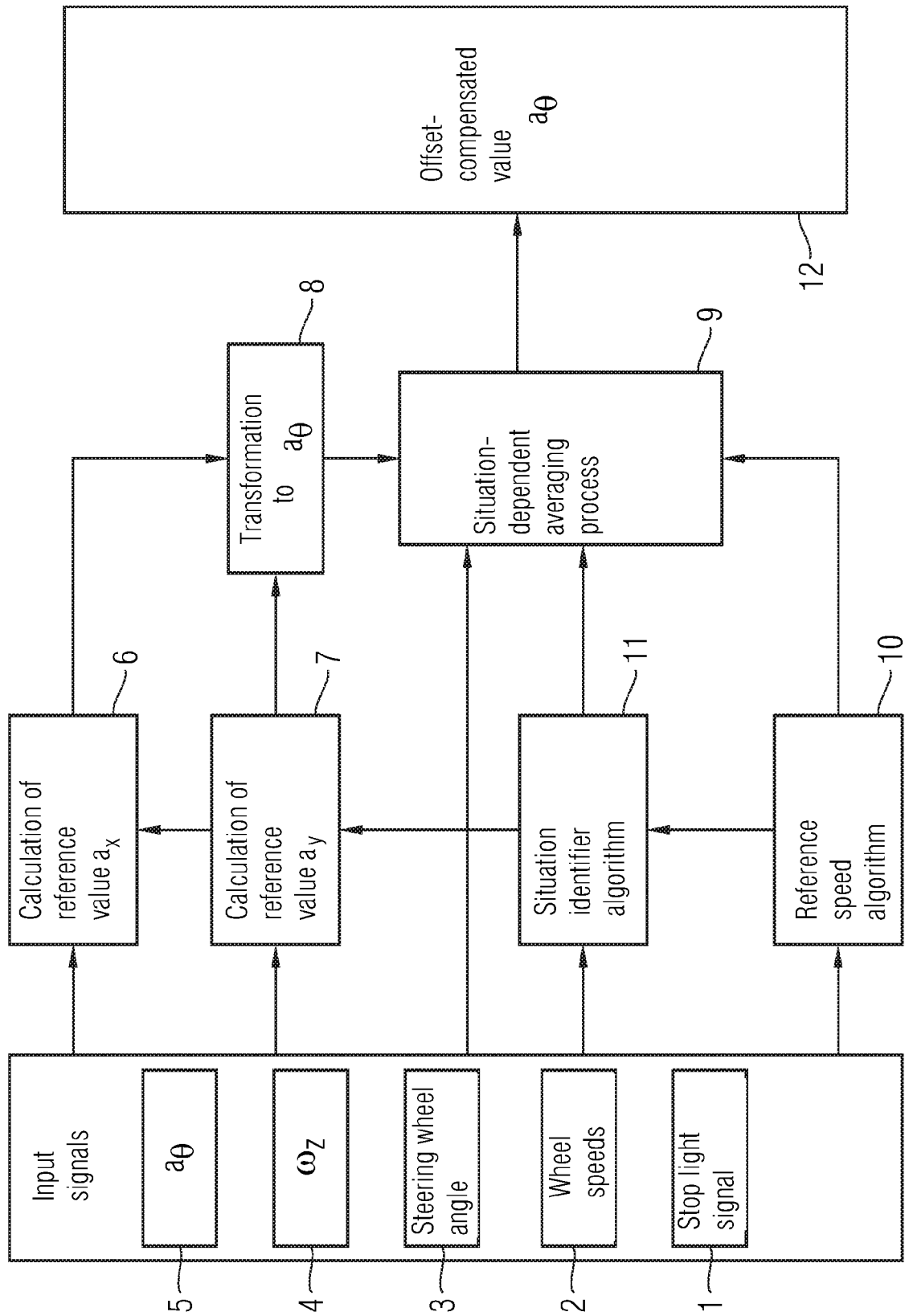

METHOD FOR THE DETERMINATION OF LONG-TERM OFFSET DRIFTS OF ACCELERATION SENSORS IN MOTOR VEHICLES

CROSS-REFERENCE TO RELATED APPLICATIONS

This application is a U.S. national stage application of International Application No. PCT/EP2006/066171 filed Sep. 8, 2006, which designates the United States of America, and claims priority to German application number 10 2005 054 208.5 filed Nov. 14, 2005, the contents of which are hereby incorporated by reference in their entirety.

TECHNICAL FIELD

The invention relates to a method for determining long-term offset drifts of acceleration sensors in a motor vehicle.

BACKGROUND

Typical offset drifts of such inertia sensors can be divided into two shares operating on different timescales. Drifts which are produced by temperature changes in the sensor and/or its surroundings extend over a few minutes to a few hours. Long-term drifts of the sensor offset also result, which can essentially be attributed back to ageing processes and can become noticeable over periods of several days, weeks and as long as months.

In conventional approaches, the focus was generally on the temperature-dependent part of the offset and attempts were made to determine this by means of a characteristic curve as a function of the temperature. To this end, a method for temperature compensation of a sensor signal is known from DE 32 12 611 A1. According to this method, in the case of sensors with a characteristic curve, the offset of which when in a non-loaded state has a first temperature coefficient and the increase of which has a second temperature coefficient, with the quotient of the temperature coefficient approximately being constant, the point is determined at which the characteristic curves intersect in the case of a different temperature. The measured value is determined from the coordinates of this point, a sensor signal, the sensor temperature and one of the temperature coefficients, preferably using a microcomputer.

Hardware-specific approaches are also known from the prior art, in which the offset of the output voltage is determined by comparison with a variable comparison voltage. To this end, DE 33 34 603 A1 discloses an amplifying arrangement for an acceleration sensor. An amplifying arrangement for an acceleration sensor, in particular a piezoelectric acceleration sensor for restraint systems in motor vehicles, is proposed here, with the output signal of the amplifying arrangement being compared in a comparator with a comparison voltage in a fixed or variable clock pulse for offset compensation purposes. As a function of the output signal of this comparator, the output power of a current source is increased or reduced in the clock pulse and supplied to the amplifier input for compensation purposes. The offset drift over time and temperature can be compensated for in this way even with cheap acceleration sensors.

The disadvantage of previous solutions is that neither the temperature dependency nor the voltage changes represent ideal variables, which precisely determine an offset drift of an acceleration sensor, since these variables do not represent any parameters which are directly associated with an offset drift.

SUMMARY

A method for determining offset drifts of acceleration sensors can be created, which allows an exact determination and compensation of the long-term offset drift.

According to an embodiment, a method for determining long-term offset drifts of an acceleration sensor in a motor vehicle, may comprise the steps of:
  determining a longitudinal vehicle speed in a center of gravity of the vehicle;
  calculating a first share of driving dynamics for a longitudinal reference acceleration as well as a second share of driving dynamics for a transverse reference acceleration from the longitudinal vehicle speed and a yaw rate;
  calculating a third share of driving dynamics in a reference acceleration in a plane by transforming the first and second share for the position and orientation of the acceleration sensor;
  determining a long-term offset drift of the acceleration sensor from measured values of the acceleration sensor and the third share of driving dynamics in the reference acceleration by means of a situation-dependent averaging process.

According to a further embodiment, the longitudinal vehicle speed can be calculated from the wheel speeds, the steering wheel angle, the stop light signal and the direction of travel. According to a further embodiment, the absolute value and sign of the speed can be reproduced by means of the rotational wheel speed to be ascertained for the wheel speed determination. According to a further embodiment, a situation-dependent statistical evaluation of different sensor signals can be implemented. According to a further embodiment, the offset drift of the sensor may be determined as an average value. According to a further embodiment, an averaging time constant of several hours can be selected. According to a further embodiment, in the case of the situation-dependent averaging process the measured acceleration due to gravity may be on average zero when calculating the offset drift. According to a further embodiment, a situation identifier may be used. According to a further embodiment, the situation identifier may determine highly dynamic driving situations and journeys in the case of steep gradients and/or transverse inclinations as well as standstills. According to a further embodiment, highly dynamic driving situations and journeys in the case of steep gradients and/or transverse inclinations as well as standstills are excluded from the averaging process.

BRIEF DESCRIPTION OF THE DRAWINGS

Further advantages and embodiments are described below with reference to an exemplary embodiment as well as with reference to the drawing, in which:

FIG. 1 shows a schematic representation of a block diagram of the method according to an embodiment.

DETAILED DESCRIPTION

According to various embodiments, the longitudinal vehicle speed $V_x$ is first determined. Subsequently, the share of the driving dynamics in the longitudinal reference acceleration $a_{x,ref}^{dyn}$ and in the transverse reference acceleration $a_{y,ref}^{dyn}$ is calculated from the longitudinal vehicle speed $V_x$ and the yaw rate $\omega_z$. These values are used to determine the share of the driving dynamics in the reference acceleration $a_{\theta,sensor}^{dyn,ref}$ at the position of the acceleration sensor to be compensated by transforming the driving dynamics in the reference acceleration ($a_{x,ref}^{dyn}$, $a_{y,ref}^{dyn}$) calculated for the center of gravity of the vehicle, where θ describes the orientation of the sensor in the plane. The offset drift of the sensor is finally determined from the measured value $a_{\theta,sensor}^{meas}$ of the sensor and the proportion of the driving dynamics in the reference acceleration $a_{\theta,sensor}^{dyn,ref}$ with the assumption being made therefrom that this is identical to the proportion of the measured value in the driving dynamics $a_{\theta,sensor}^{dyn,meas} = a_{\theta,sensor}^{dyn,ref}$ and in some situations the share of the gravitation in the measured sensor signal averages zero in the long term.

The situation-dependent statistical evaluation of different sensor signals underlies the method according to various embodiments. If the inertia sensor to be compensated in the vehicle plane is applied in any direction θ, a reference value is calculated from the yaw rate $\omega_z$, the steering wheel angle δ and the wheel speeds $V_1$, $V_2$, $V_3$, $V_4$. Here the direction θ is the angle between the longitudinal axle of the vehicle and the measurement direction of the acceleration sensor. An important base value for the further reference calculations is the longitudinal vehicle speed in the center of gravity, which can be calculated from the wheel speeds, the steering wheel angle δ, the stop light signal BLS, and the direction of travel:

$$V_x = V_x(V_1, V_2, V_3, V_4, \delta, \text{BLS}, \text{direction of travel})$$

If the rotational wheel speeds specify not only the sum but also the sign of the speed, the additional information concerning the current direction of travel is no longer needed. As a simplest approximation for the share of the driving dynamics in the longitudinal reference acceleration in the center of gravity of the vehicle, this produces:

$$a_{x,ref}^{dyn} = \frac{d}{dt}V_x - l_R \omega_z^2,$$

where $l_R$ is the distance from the center of gravity of the vehicle to the rear axle. As a simplest approximation, the share of the driving dynamics in the transverse reference acceleration in the center of gravity of the vehicle results in:

$$a_{y,ref}^{dyn} = V_x \omega_x.$$

It is also possible to use other methods to form references. Care should however be taken in ensuring that these are as simple as possible and the incoming values do not have systematic errors, which may result in a distortion of the subsequent average value methods.

Two transformations are needed in order to achieve a driving dynamic reference value for the acceleration sensor to be compensated which is located in the plane. The reference acceleration ($a_{x,ref}^{dyn}$, $a_{y,ref}^{dyn}$) in the driving dynamics which is calculated in the center of gravity of the motor vehicle must firstly be transformed to the position of the sensor:

$$a_{x,sensor}^{dyn,ref} = a_{x,ref}^{dyn} - r_x \omega_z^2$$

$$a_{y,sensor}^{dyn,ref} = a_{y,ref}^{dyn} - r_y \omega_z^2$$

Here $r_x$ and $r_y$ the longitudinal and/or lateral distance of the sensor position from the center of gravity of the vehicle. Absolute values were negatively affected in this case, in which the derivation of the speeds, as well as the rolling rate and pitch rate occur. The following relation can be used to project this onto the measurement direction θ of the sensor:

$$a_{\theta,sensor}^{dyn,ref} = a_{x,sensor}^{dyn,ref} \cos\theta + a_{y,sensor}^{dyn,ref} \sin\theta$$

The measured value, which is reproduced by the sensor to be monitored, results from the following equation $$a_{\theta,Sensor}^{meas} = a_{\theta,Sensor}^{dyn,meas} + a_{\theta,Sensor}^{offset} + g_{II}$$

Here $a_{\theta,Sensor}^{dyn,meas}$ is the proportion of the measured value in the driving dynamics, $a_{\theta,sensor}^{offset}$ is the offset of the sensor to be determined and $g_{II}$ is the component of the acceleration due to gravity which is present in the measuring direction.

The basic principle underlying the various embodiments is that the earth is round on average and that in the long term the component $g_{II}$ is thus averaged during driving. This method predetermines the time scale for the averaging process. It is not possible to travel uphill constantly over several days, without having to come back down again. An averaging constant of several hours is thus expedient. Accordingly, the long-term share in the sensor offset results according to the following formula:

$$a_{\theta,langfristig}^{offset} = \overline{a_{\theta,Sensor}^{meas}} - \overline{a_{\theta,Sensor}^{dyn,ref}},$$

with the averaging process being indicated by the line and having been used, such that $\overline{g_{II}} = 0$, and the further assumption being made that $a_{\theta,sensor}^{dyn,meas} - a_{\theta,sensor}^{dyn,ref} = 0$.

Situation identifiers are used in order to be able to accurately implement this averaging process, said situation identifiers identifying highly dynamic driving situations and journeys in the case of steep gradients and/or transverse inclinations as well as vehicle standstills and excluding these from the averaging process.

The longitudinal vehicle speed $V_x$ is preferably calculated according to an embodiment from the wheel speeds $V_1$, $V_2$, $V_3$ and $V_4$, the steering wheel angle δ, the stop light signal and the direction of travel. It is also preferred if the absolute value and sign of the speed be reproduced by means of the rotational wheel speed to be ascertained for the wheel speed determination. A situation-dependent statistical evaluation of different signals accordingly underlies the method according to an embodiment.

It is also advantageous if the offset drift of the sensor is determined as an average value, with an averaging constant of several hours being selected, since with this time scale, the measured acceleration due to gravity during the situation-dependent calculation of the offset drift averages zero.

It is also advantageous if situation identifiers are used, which identify highly dynamic driving situations and journeys in the case of steep gradients and/or transverse inclinations, so that these extraordinary driving situations are ruled out from the averaging process. Standstills must also be excluded from the averaging process.

The embodiments and developments can be used individually or in combination with one another. FIG. 1 shows a schematic illustration of a block diagram of the method according to an embodiment. The input for the method is preferably provided by five input signals. The input signals result from the stop light signal 1, the wheel speeds 2, the steering wheel angle 3, the yaw rate 4 and the acceleration 5. The share of the driving dynamics in the longitudinal reference acceleration 6 and/or in the transverse reference acceleration 7 is calculated in the center of gravity of the vehicle from these signals. These reference accelerations 6, 7 calculated for the center of gravity of the vehicle are set up by transformation 8 to the position of the sensor. These reference accelerations determined from the transformation 8 for the position of the sensor form a basis for the situation-dependent averaging process 9.

Furthermore, a reference speed 10 is also determined from the afore-cited input signals, said reference speed 10 being used as a direct basis for the situation-dependent averaging process 9 as well as for the reference calculations 6, 7.

The measured values resulting from the input signals 1 to 5 are additionally also detected and analyzed by the situation identifier 11, the evaluation of which influences both the calculation of the reference accelerations 6, 7 and also the situation-dependent averaging process 9. The offset-compensated value 12 for the acceleration sensor then results from this situation-dependent averaging process 9.

The present invention allows the long-term share in the offset of acceleration sensors, which are applied in the plane of a motor vehicle in any direction and any position, to be determined. It is precisely these long-term drifts, which are very difficult to model and thus could previously only be compared inadequately by characteristic curves.

The invention claimed is:

1. A method for determining long-term offset drills of an acceleration sensor in a motor vehicle, with the method comprising the steps:
   determining a longitudinal vehicle speed in a center of gravity of the vehicle from a measured value of at least one vehicle speed sensor;
   calculating a first share of driving dynamics for a longitudinal reference acceleration as well as a second share of driving dynamics for a transverse reference acceleration from the longitudinal vehicle speed and a yaw rate;
   calculating a third share of driving dynamics in a reference acceleration in a plane by transforming the first and second share for the position and orientation of the acceleration sensor;
   recording the third share of driving dynamics; and
   automatically determining a long-term offset drill of the acceleration sensor from measured values of the acceleration sensor and the recorded third share of driving dynamics in the reference acceleration by means of a situation-dependent averaging process, such that the long-term offset drift is determined as an average value of offset drift for an averaging period that includes both uphill and downhill travel of the motor vehicle, such that offset drift values corresponding to periods of uphill and downhill travel of the motor vehicle in which associated gravitational affects on the acceleration sensor are non-zero are included in the determined average value of offset drift, such that periods of non-zero acceleration due to gravity as a result of the uphill and downhill travel during the averaging period are assumed to average to zero over the averaging period; and
   wherein the situation-dependent averaging process incorporates the assumed average value of zero for the average acceleration due to gravity during the averaging period, such that acceleration due to gravity during the included periods of uphill and downhill travel is not factored into the long-term offset drift calculation.

2. The method according to claim 1, wherein the longitudinal vehicle speed is calculated from the wheel speeds, the steering wheel angle, the stop light signal and the direction of travel.

3. The method according to claim 2, wherein the absolute value and sign of the speed is reproduced by means of the rotational wheel speed to be ascertained for the wheel speed determination.

4. The method according to claim 1, wherein a situation-dependent statistical evaluation of different sensor signals is implemented.

5. The method according to claim 1, wherein a situation identifier is used.

6. The method according to claim 5, wherein the situation identifier determines highly dynamic driving situations and journeys in the case of steep gradients and/or transverse inclinations as well as standstills.

7. The method according to claim 6, wherein highly dynamic driving situations and journeys in the case of steep gradients and/or transverse inclinations as well as standstills are excluded from the averaging process.

8. A device for determining long-term offset drifts of an acceleration sensor in a motor vehicle, comprising:
   means for determining a longitudinal vehicle speed in a center of gravity of the vehicle;
   means for calculating and recording a first share of driving dynamics for a longitudinal reference acceleration as well as a second share of driving dynamics for a transverse reference acceleration from the longitudinal vehicle speed and a yaw rate;
   means for calculating a third share of driving dynamics in a reference acceleration in a plane by transforming the first and second share for the position and orientation of the acceleration sensor;
   means for automatically determining a long-term offset drift of the acceleration sensor from measured values of the acceleration sensor and the recorded third share of driving dynamics in the reference acceleration by means of a situation-dependent averaging process, such that the long-term offset drift is determined as an average value of offset drift for an averaging period that includes both uphill and downhill travel of the motor vehicle, such that offset drift values corresponding to periods of uphill and downhill travel of the motor vehicle in which associated gravitational affects on the acceleration sensor are non-zero are included in the determined average value of offset drift, such that periods of non-zero acceleration due to gravity as a result of the uphill and downhill travel during the averaging period are assumed to average to zero over the averaging period; and
   wherein the situation-dependent averaging process incorporates the assumed average value of zero for the average acceleration due to gravity during the averaging period, such that acceleration due to gravity during the included periods of uphill and downhill travel is not factored into the long-term offset drift calculation.

9. The device according to claim 8, comprising sensors to determine the wheel speeds, the steering wheel angle, the stop light signal and the direction of travel, used for calculating the longitudinal vehicle speed.

10. The device according to claim 9, wherein the absolute value and sign of the speed is reproduced by means of the rotational wheel speed to be ascertained for the wheel speed determination.

11. The device according to claim 8, wherein a situation-dependent statistical evaluation of different sensor signals is implemented.

12. The device according to claim 8, comprising a situation identifier.

13. The device according to claim 12, wherein the situation identifier determines highly dynamic driving situations and journeys in the case of steep gradients and/or transverse inclinations as well as standstills.

14. The device according to claim 13, wherein highly dynamic driving situations and journeys in the case of steep gradients and/or transverse inclinations as well as standstills are excluded from the averaging process.

* * * * *